Jan. 28, 1969  J. PICKLES  3,423,785
POSITION CONTROL MECHANISM
Filed Jan. 10, 1966
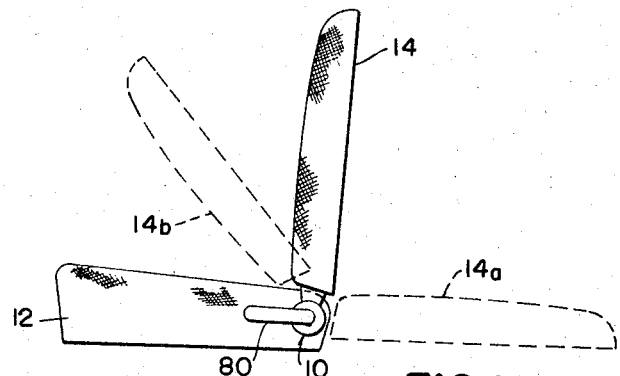
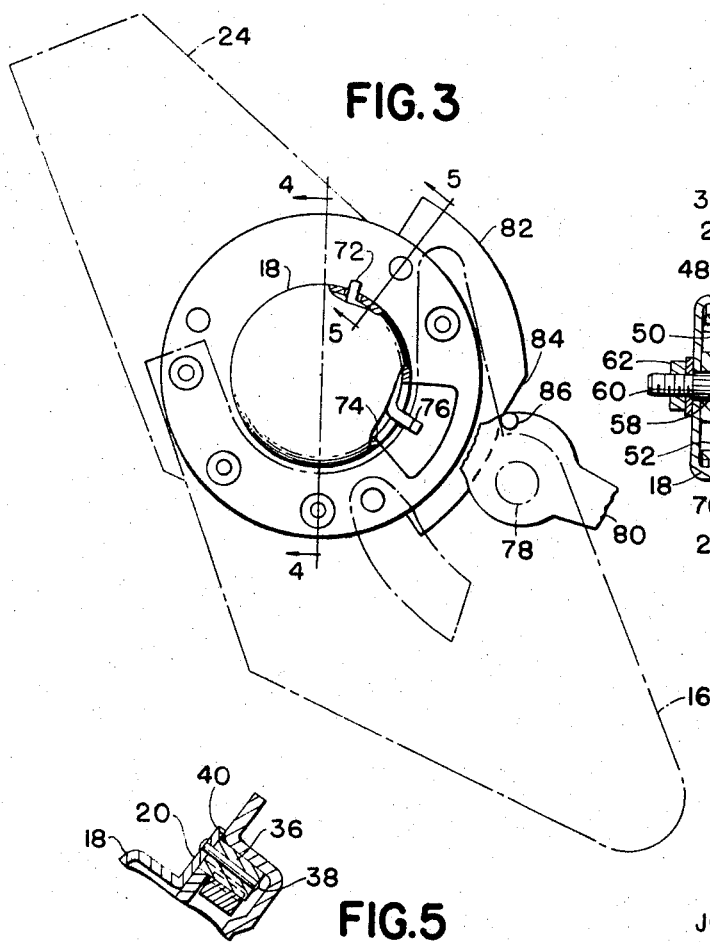
INVENTOR.
JOSEPH PICKLES
BY Whittemore,
Hulbert & Belknap
ATTORNEYS

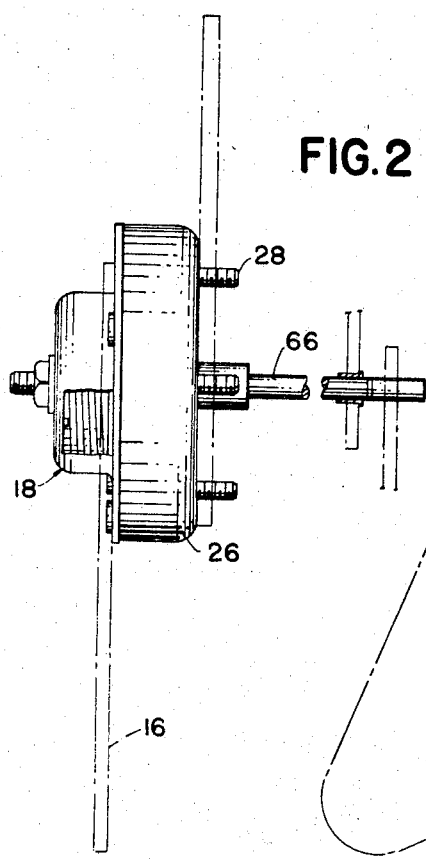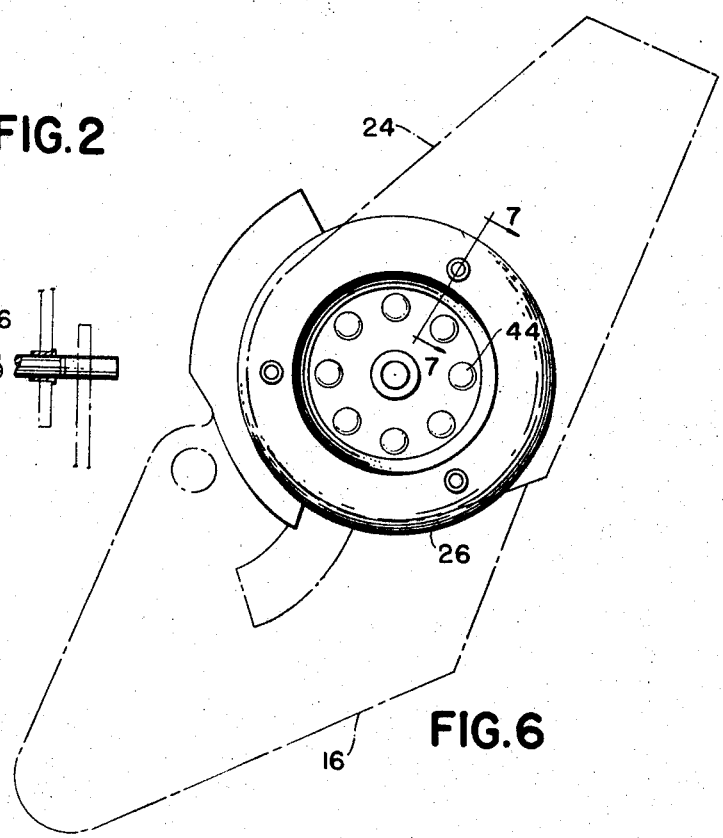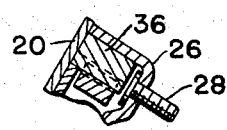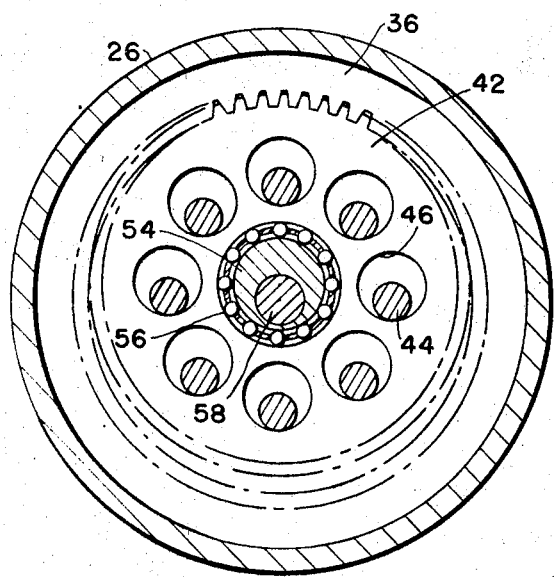

United States Patent Office 3,423,785
Patented Jan. 28, 1969

3,423,785
POSITION CONTROL MECHANISM
Joseph Pickles, Dearborn, Mich., assignor to Ferro Manufacturing Corporation, Detroit, Mich., a corporation of Michigan
Filed Jan. 10, 1966, Ser. No. 519,740
U.S. Cl. 16—140
Int. Cl. E05d *11/08;* G05g *5/06;* B60n *1/02*
9 Claims

ABSTRACT OF THE DISCLOSURE

A pair of members are pivoted together and a friction drum is rotatable substantially about the pivot axis between said members. Epicyclic gearing interconnects said members and includes an eccentric mounting effective to produce substantial rotation of said friction drum upon limited rotation between said members. A coil spring brake is wound around the friction drum, and a release lever acts upon one end of the coil spring brake to release the same.

---

It is an object of the present invention to provide mechanism for controlling the position between a pair of relatively movable members.

It is a further object of the present invention to provide mechanism adapted to releasably lock said members against movement in one direction and to frictionally oppose relative movement between said members in the opposite direction.

It is a further object of the present invention to provide mechanism as described in the preceding paragraph together with release means effective to release both the locking of said members against movement in one direction and the frictional opposition to movement of said members in the opposite direction.

It is a further object of the present invention to provide such mechanism in combination with seat structure in which the members may be the seat proper and an adjustable seat back, or the members may be an adjustable seat and the support structure therefor.

It is a feature of the present invention to provide mechanism for controlling relative movement between a pair of members comprising a third member associated therewith and interconnected thereto by motion multiplying means, and in which the locking means and frictionally acting means is associated with the third member.

Still more specifically, it is a feature of the present invention to provide a pair of members pivoted together for relative rocking movement about an axis, a third member rotatable about said axis, motion multiplying means including gearing interconnected between said pair of members and said third member.

It is a further feature of the present invention to provide mechanism as described in the preceding paragraph in combination with a clutch-brake device, such for example as a coil spring associated with a friction drum on said third member.

It is a further object of the present invention to provide a seat having a seat back movable rearwardly from a substantially vertical operating position to a substantially horizontal reclining position and movable forwardly from the vertical position to a position providing access clearance in back of the seat, in association with manually releasable locking means to provide for movement of the seat back rearwardly from the vertical position into any preselected rearwardly inclined position, and frictional means providing a predetermined frictional force opposing forward movement of said seat back to vertical position, means for releasing the locking and frictional means, and automatically operable cam means for operating the release means when the seat back is moved forwardly from the vertical position.

Other objects and features of the invention will become apparent as the description proceeds, especially when taken in conjunction with the accompanying drawings, illustrating a preferred embodiment of the invention, wherein:

FIGURE 1 is a side elevational schematic view showing the relationship between the seat proper, the seat back, and the seat back movement controlling mechanism.

FIGURE 2 is an elevational view of the mechanism.

FIGURE 3 is an enlarged side elevational view of the motion controlling mechanism as viewed from the left in FIGURE 2.

FIGURE 4 is a section on the line 4—4, FIGURE 3.

FIGURE 5 is a section on the line 5—5, FIGURE 3.

FIGURE 6 is a side view of the mechanism viewed from the right of FIGURE 2.

FIGURE 7 is a fragmentary sectional view on the line 7—7, FIGURE 6.

FIGURE 8 is a further enlarged sectional view on the line 8—8, FIGURE 4.

While the mechanism of the present invention has many possible applications, it is particularly useful in controlling adjustability of the seat back of a vehicle seat to permit the seat back to be adjusted to any desired position between a substantially upright operating position and a substantially rearwardly extending reclining position, and further to provide for forward movement of the seat back from the substantially vertical position to afford access to space in the rear of the seat.

The mechanism, the details of which will be described subsequently, is illustrated generally at 10 in FIGURE 1 and is associated with a pivot connection between the seat proper 12 and the seat back 14 which is adjustable from the substantially erect operating position shown in full lines to the reclining position shown in dotted lines at 14a and the forward access position shown in dotted lines at 14b.

The mechanism 10 which is shown in the remaining figures of the drawings, provides a pivot connection for the seat back 14 which permits the seat to be positioned in any desired position between the full line position and the position illustrated at 14a, and similarly, to be moved forwardly from the full line position to the position 14b. Associated with the mechanism 10 is structure which provides for locking the seat back against rearward movement in any position between the full line position and the position 14a, while at the same time provides sufficient frictional opposition to forward motion to maintain the seat back in any position into which it has been moved. Resilient means are provided urging the seat back upwardly or forwardly toward the upright position illustrated in full lines and this means is effective, when the locking and frictional means is released, to provide for movement of the seat back upwardly to the full line position.

The mechanism indicated generally at 10 comprises a pair of bracket parts each of which may be mounted in a stationary position on the seat proper 12, and the other of which is connected to the seat back 14 for movement therewith. In the illustrated embodiment of the invention however, a selected one of the components is illustrated and described as connected to the stationary structure.

Referring now more specifically to FIGURES 2–7 there is shown in dot and dash lines the outline of a mounting bracket 16 suitably fixed to the seat proper 10. This bracket carries a cup member 18 having a radially extending flange 20 provided with a plurality of tapped bosses 22 for the reception of screws connecting the cup 18 to the bracket 16. Also shown in FIGURES 3 and 6 in dot and dash lines, is a second bracket 24 connected to a cover 26 by screws 28, the arrangement of which is best illustrated in FIGURE 7. The bracket 24 is fixedly attached to the seat back 14 for movement therewith.

The cover 26 is provided with a cylindrical wall 30 the free edge of which is adapted to abut against the peripheral portion of the flange 20 of the cup 18.

The wall 30 in association with a generally circular wall 32 provides a chamber 34 in which operating mechanism is received. The operating mechanism comprises an internal gear 36 which as best seen in FIGURE 5, is rigidly secured to the flange 20 of the cup 18. As seen in FIGURE 5, the internal gear is connected to the flange 20 by rivets 38 but preferably it is also brazed thereto as indicated at 40.

Mounted on the wall 32 of the cover 26 is an external gear 42. The external gear 42 is in mesh with the internal gear 36 and its connection to the wall 32 is by a plurality of rivets 44 extending through enlarged openings 46, the opposite ends of the rivets being connected to a bearing plate 48 as best illustrated in FIGURE 4.

Received in a chamber 50 in the cup 18 is a cylindrical drum 52 having a portion extending into the chamber 34 provided in the cover 26. This portion includes a cylindrical eccentric 54 received in the central opening of the external gear 42 and provided with needle bearings 56. The cylindrical drum 52 with its eccentric extension 54 is mounted for rotation about a shaft 58 having a threaded end 60 receiving a nut 62, and having a socketed enlarged head 64 engageable with the outer surface of the wall 32 of the cover 26. The nut 62 thus provides a firm assembly between the cup 18 and the cover 26.

The socketed head 64 of the shaft 58 is brazed or otherwise rigidly secured to the cover 26 so that as the cover 26 is rotated about the axis of the shaft 58, the socketed head 64 is rotatable therewith. Extending laterally from the socketed head 64 is a torsion rod or spring 66 which is under initial stress and which is further stressed as the seat back 14 is moved rearwardly towards its reclining position 14a and is thus effective to tend to restore the seat back to its upright position.

As the seat back 14 with the affixed bracket 24 and the cover 26 are rotated about the axis of the shaft 58, forces are devolped between the external gear 42 and the eccentric 54 causing the eccentric to rotate in a direction opposite to the direction of rotation of the cover 26 at a rate which is determined by the difference between the number of teeth in the internal gear 36 and the external gear 42, and the total number of teeth in the internal gear. In a practical embodiment of the invention the number of teeth of the external and internal gears is selected such that the eccentric rotates through an arc 13 times greater than the arc of movement of the cover 26 and the external gear 42 attached thereto.

It will of course be understood that the necessary relative movement between the external gear 42 and the wall or plate 32 of the cover 26 is permitted by reason of the relatively large openings 46 through which the intermediate portions of the rivets 44 extend. The forces which ultimately rotate the eccentric portion 54 and the drum 52 are transmitted from the cover 26 through the rivets 44 to the external gear 42 and thence to the eccentric portion 54 of the drum. It will of course be apparent that similar results could be obtained by fixing the position of the cover 26 and correspondingly rotating the cup 18. It may also be noted that the angular or relatively rotational movement between the cup 18 and the cover 26 could be mechanically caused by rotation of the drum 52 and its eccentric portion 54, as for example by the application of a crank thereto.

Inasmuch as the structure so far described will result in angular rotation of the drum 52 through an arc many times greater than the arc of movement of the cover 26 relative to the stationary cup 18, it becomes a simple matter to locate the cover 26 and hence the seat back 14 by means effective to control the position of the drum 52. Specifically, this is accomplished by providing a coil spring 70 in the cup 18 in frictional contact with the outer cylindrical surface of the drum 52. As best seen in FIGURE 3, one end 72 of the coil spring 70 is fixed to the cup 18 as for example by being received in a notch or recess therein. The coil spring is then wound in several helical convolutions around the drum and its opposite end 76 is bent substantially radially of the coil to extend outwardly through an opening 74 provided in a side wall of the cup 18. The spring, which may be of circular cross-section but which preferably is of rectangular or square cross-section, is initially coiled to have an internal diameter slightly smaller than the outside diameter of the drum 52. Accordingly, when the end 72 of the spring is fixed in the notch of the cup and the spring is pressed onto the drum, it is in frictional contact therewith and the free end 76 of the spring is movable in either direction. It will be readily apparent that rotation of the drum 52 in a direction tending to cause the spring to wind up will in turn cause it to lock frictionally with the outer surface of the drum and thus to positively prevent rotation of the drum in that direction. The spring is wound and positioned such that the direction in which it locks to prevent relative movement between the brackets 16 and 24 is in the direction corresponding to rearward movement of the seat back from the full line substantially vertical position illustrated in FIGURE 1. On the other hand, the spring does not act as a frictional locking device to prevent rotation of the drum 52 in the opposite direction, but instead, it opposes a substantially constant frictional resistance to rotation which is caused by appropriate configuration of the spring to provide frictional opposition to motion sufficient to overcome the torque applied to the seat back by the torsion spring 66. The stationary bracket 16 is provided with mounting means indicated diagrammatically at 78 for an operating lever a portion of which is illustrated at 80, and which includes an end portion engageable with the end portion 76 of the spring. The lever 80 is preferably lightly spring biased in a direction tending to cause the spring end 76 to move in the direction tending to wind the spring more tightly on the drum 52. The operator by appropriate movement of the lever 80, may shift the spring end 76 in a direction tending to cause the spring to unwind on the drum 52, thus relieving the drum of frictional opposition to movement.

With the foregoing construction the occupant of the seat may move the lever 80 to its release position and push the seat back to the exactly required position, at which time the lever may be released and the spring 52 will, as a result of its own resilience and the slight additional effect of the spring biasing the lever 80, oppose frictional resistance to rotation of the drum 52. If now, the occupant of the seat applies a much greater force tending to move the seat back rearwardly, the frictional engagement between the spring and the drum will cause the spring to wind more tightly on the drum and thus, with an extremely movement of the drum, result in effect producing a positive locking of the drum against further movement in such direction. Due to the multiplying factor between seat back rotation and drum rotation, this takes place with no perceptible movement of the seat back. On the other hand, leaving the lever in its normal position, it is possible to move the seat back manually to the erect position since during such movement the forces acting between the drum and spring tend to cause unwinding of the spring and in effect maintain a substantially constant frictional opposition to movement. Thus, the occupant of the vehicle may mechanically move the seat back to upright position without operating the lever 80.

On the other hand of course, if the operator releases the spring friction by appropriate operation of the lever 80, the torsion spring 66 will be effective to move the seat back to its upright position.

In the event that the aforementioned construction is applied to a two-door vehicle, it is desirable in many cases to move the seat back forwardly from its substantially vertical operating position to a position in which clearance is provided in back of the vehicle seat. In order to accomplish this most efficiently, the cover 26 which is fixed to the bracket 24 is provided with a cam 82 having a camming surface 84 cooperable with a cam engaging element 86 carried by the lever 80. Thus, when the seat back is moved forwardly from its vertical position, the cam surface 84 engages the follower 86 and rotates the lever 80 to a position in which it releases the spring 70 from frictional engagement with the drum 52. Thus, the seat back may readily be moved forwardly without engaging the lever 80, it being necessary only to overcome the effectiveness of the torsion spring 66 and the friction inherently developed in the motion multiplying mechanism. As the seat back is moved to its vertical position the cam moves out of engagement with the cam follower 86 and the spring biasing means normally applied to the lever 80 causes it to move to a position in which the spring 70 has its normal frictional engagement with the drum 52.

It was previously noted that relative movement between the brackets could be accomplished by applying rotation directly to the eccentric. This permits selection of epicyclic gearing which is irreversible or self-locking against forces applied directly to either of the brackets so that relative movement between these parts can be accomplished only by directly rotating the eccentric.

The drawing and the foregoing specification constitute a description of the improved position control mechanism in such full, clear, concise and exact terms as to enable any person skilled in the art to practice the invention, the scope of which is indicated by the appended claims.

What I claim as my invention is:

1. Position control apparatus comprising a pair of pivotally connected members, a third member mounted for relative rotation to both members of said pair, motion multiplying mechanism comprising epicyclic gearing connected between said third member and one of said pair of members and actuated by relative movement between the members of said pair for providing multiplied motion of said third member, means cooperating with said third member and with one of said pair of members to retain said third member in a fixed position relative to the last named one of said members and thereby to retain said pair of members in a relatively fixed position, said epicyclic gearing including an internal gear fixed to one of said pair of members concentric with the pivot axis between said pair of members, and an external gear carried by said third member for oscillation thereon about a center spaced from the axis of said internal gear, means preventing substantial rotation of said external gear relative to said second member, said third member having a cylindrical eccentric portion on which said external gear is rotatable.

2. An adjustable seat back comprising a fixed mounting bracket, a pivot support on said fixed bracket defining a pivot axis, a movable seat back support bracket pivoted to said pivot support, a rotary friction member rotatably carried by said pivot support for rotation about the pivot axis thereof, drive means including gearing connecting said brackets and friction member effective to rotate said friction member upon angular movement of said seat back with a multiplied angular movement, friction means operatively connected to one of said brackets and in frictional engagement with said friction member, said friction member comprising a cylindrical drum, said friction means comprising a spring wound around said drum and secured at one end to said one bracket, said spring being wound in a direction such that said spring tightens on said drum to lock said movable support bracket against movement on slight movement thereof in a direction corresponding to moving the seat back rearwardly from upright position, manually operable release means connected to said spring, resilient means connected to said movable bracket to urge said seat back from rearward lowered position to its forward upright position, said spring being wound on said drum under tension to provide friction sufficient to overcome the force applied to said seat back support bracket from said resilient means, but of a value such that the seat back can be raised or moved forwardly by direct application of manual force to the seat back by a passenger without operation of said manually operable release means.

3. An adjustable seat back as defined in claim 2 in which said release means comprises a release element operatively connected to the free end of said spring and movable to apply an unwinding torque to said spring to release the friction normally opposing movement of said seat back by said resilient means.

4. An adjustable seat back comprising a fixed mounting bracket, a movable seat back support bracket pivoted to said mounting bracket, a rotary friction member, drive means including gearing connecting said brackets and friction member effective to rotate said friction member upon angular movement of said seat back with a multiplied angular movement, and friction means operatively connected to said mounting bracket and in frictional engagement with said friction member, said friction member, comprising a cylindrical drum, said friction means comprising a spring wound around said drum and secured at one end to said mounting bracket, said spring being wound in a direction such that said spring tightens on said drum to lock said movable support bracket against movement on slight movement thereof in a direction corresponding to moving the seat back rearwardly from upright position, resilient means connected to said movable bracket to urge said seat back from rearward lowered position to its forward upright position, said spring being wound on said drum under tension to provide friction sufficient to overcome the force applied to said seat back from said resilient means, but of a value such that the seat back can be raised or moved forwardly by direct application of manual force to the seat back by a passenger, a release element connected to the free end of said spring and movable to apply an unwinding torque to said spring to release the friction normally opposing movement of said seat back by said resilient means, comprising a cam mechanism including a member movable relative to said spring upon movement of said movable support bracket effective to apply an unwinding torque to said spring when said seat back is moved forwardly from its normal upright position to provide clearance for access to the space in rear of said seat back.

5. An adjustable seat back comprising a fixed mounting bracket, a movable seat back support bracket pivoted to said mounting bracket, a rotary friction member, drive means including gearing connecting said brackets and friction member effective to rotate said friction member upon angular movement of said seat back with a multiplied angular movement, and friction means operatively connected to said mounting bracket and in frictional engagement with said friction member, said friction member comprising a cylindrical drum, said friction means comprising a spring wound around said drum and secured at one end to said mounting bracket, said spring being wound in a direction such that said spring tightens on said drum to lock said movable support bracket against movement on slight movement thereof in a direction corresponding to moving the seat back rearwardly from upright position, resilient means connected to said movable bracket to urge said seat back from rearward lowered position to its forward upright position, said spring being wound on said drum under tension to provide friction sufficient to overcome the force applied to said seat back from said resilient means, but of a value such that the seat back can be raised or moved forwardly by direct application of manual force to the seat back by a passenger, a release element connected to the free end of said spring and movable to apply an unwinding torque to said spring to release the friction normally opposing movement of said seat back by said resilient means, in which said drive means includes epicyclic gearing.

6. An adjustable seat back as defined in claim 5, said gearing comprising an internal gear carried by one of said brackets, an external gear carried by said friction member and having a number of teeth nearly as great as the number of teeth of said internal gear.

7. An adjustable seat back as defined in claim 6, said friction member having an eccentric bearing portion on which said external gear is rotatably mounted.

8. Position control apparatus comprising a stationary member, a movable member connected to said stationary member for angular movement relative to said stationary member, a rotary friction element connected to said stationary member for rotary movement relative thereto and relative to said movable member, and motion multiplying epicyclic gearing connecting said element to said movable member to rotate said element through a range at least several times greater than the range of angular movement of said movable member, said epicyclic gearing comprising a meshed internal gear and an external gear connected between said members, a rotary shaft on which said members are relatively rotatable, said shaft having an eccentric portion on which one of said gears is relatively rotatable, a friction element fixed to said shaft, and releasable friction means connecting said element to one of said members.

9. Position control apparatus comprising a friction drum, means supporting said drum for rotation comprising a shaft concentric with said drum, a mounting eccentric to the axis of said shaft, a first member rotatable about the axis of said shaft, a second member rotatable about the axis of said eccentric mounting, epicyclic gearing connecting said members and comprising meshed internal and external gears, one of said gears being concentric with said shaft and the other of said gears comprising said second member to revolve about the axis of said shaft and to rotate about the axis of said eccentric mounting, and selectively operable friction means connected between said drum and one of said members.

References Cited

UNITED STATES PATENTS

| | | | |
|---|---|---|---|
| 3,343,872 | 9/1967 | Werner et al. | 297—379 X |
| 1,767,866 | 6/1930 | Wildhaber | 74—804 |
| 1,141,626 | 6/1915 | Granville | 74—805 |
| 1,942,796 | 1/1934 | Benson | 74—805 |
| 3,042,449 | 7/1962 | Hutchinson et al. | 297—366 |
| 3,236,120 | 2/1966 | Fender | 74—531 |

MILTON KAUFMAN, *Primary Examiner.*

U.S. Cl. X.R.

74—531; 297—374, 379